April 6, 1943. A. R. FERGUSSON 2,315,608
NESTED SERVING DEVICE
Filed Aug. 21, 1941 2 Sheets-Sheet 1
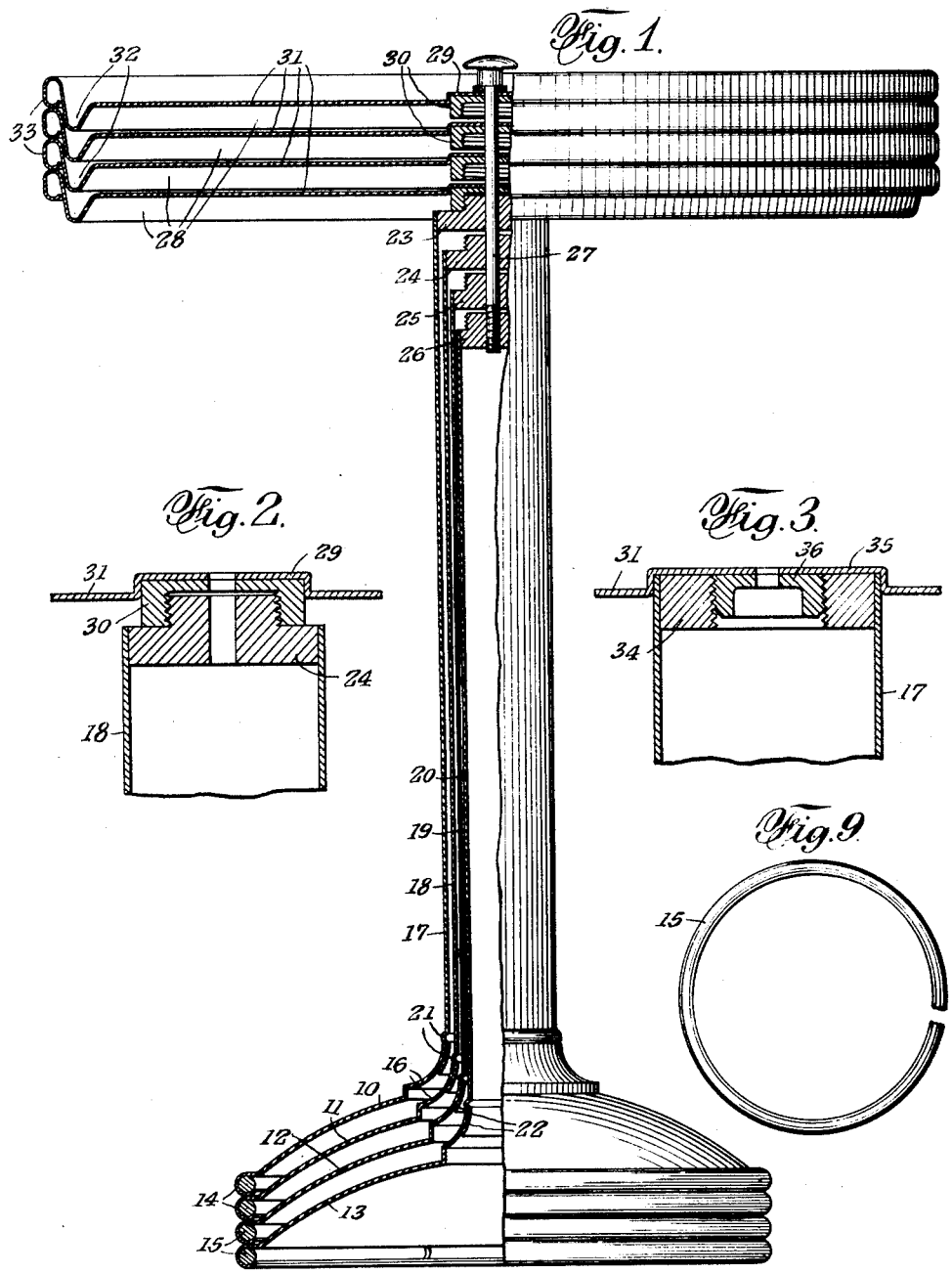
INVENTOR
ALAN R. FERGUSSON
BY
HIS ATTORNEY

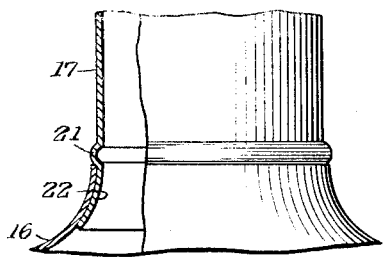
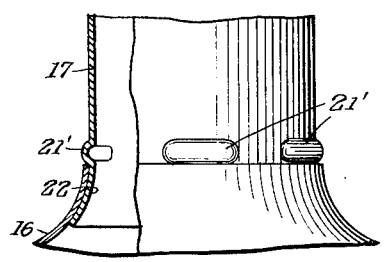
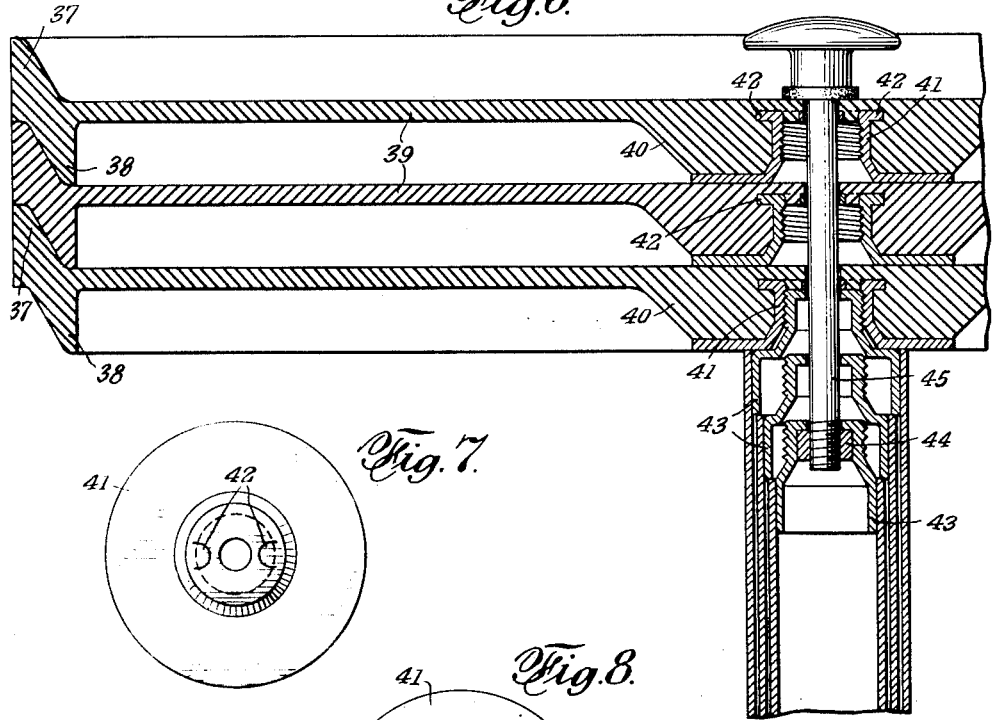
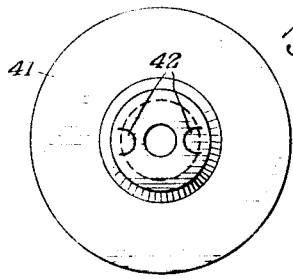
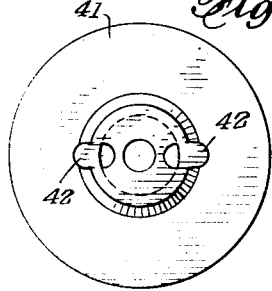

Patented Apr. 6, 1943

2,315,608

UNITED STATES PATENT OFFICE 2,315,608

NESTED SERVING DEVICE

Alan R. Fergusson, Larchmont, N. Y.

Application August 21, 1941, Serial No. 407,734

7 Claims. (Cl. 311—1)

This invention broadly relates to nestable and separable instrumentalities, and especially to a nested serving device similar to that covered by my co-pending application Serial No. 330,231, filed April 18, 1940, now Patent 2,270,041, issued Jan. 13, 1942, for Nested utility device.

The prime object of the present invention is to provide a simpler and more effective device of this kind, wherein a more sturdy construction of each nestable, individual unit is achieved at a minimum cost, and wherein the tray members of the units are interchangeable with one another and attachable with any of the standards or supports, which latter extend from their respective bases, and wherein each of the trays is capable of being used either in connection with the standards or independently therefrom as individual trays.

A further object of this invention is to provide in the device indicated a highly effective structure of the base and of the supports, and especially at the joint connecting the support with the base, whereby the nesting and partial telescoping of the bases and the telescoping of the supports is not only greatly facilitated, but whereby the nested units are closely and securely held together to form a compact, easily portable structure.

A further object of this invention is to provide within the trays and at the upper or free ends of the supports simple but effective uniform connecting means, whereby any of the trays may be united at will with any of the supports, and which connecting means are adapted for the reception of a connecting element designed for holding the units together in their nested and telescoping position.

The foregoing and still further objects of the present invention will become more fully apparent from the ensuing description of the accompanying drawings, wherein Fig. 1 is an elevation of my nested and telescoping device in its presently preferred construction, shown partially in section;

Fig. 2 is a detail section view through one form of my uniform connecting means for a tray and a support;

Fig. 3 is a modified form thereof;

Fig. 4 illustrates a detail view of one form of a joint between the support and the base;

Fig. 5 is a modified form thereof;

Fig. 6 is an enlarged detail cross sectional view through trays made of plastic;

Figs. 7 and 8 are plan views of a metal insert designed to be cast in the molded material of the trays; and Fig. 9 is a plan view in reduced form of a resilient split weight ring intended for the bases of my device.

Referring now specifically to the drawings, numerals 10, 11, 12 and 13 denote the bases of my nestable serving device units. The peripheral edges of these bases are rolled inwardly at 14 and are adapted to receive split weight rings 15, which are sprung into the rolled edges of the bases so that their resiliency holds the rings in their intended position. All of the bases are provided with reduced neck portions 16, which gradually taper toward their upper ends.

It will be noted from Fig. 1 that while the bases are all of uniform outer diameters, their reduced neck portions diminish in size from without to within, so that all of the neck portions are capable of telescoping with one another, while the outer edges of the bases nest against one another, whereby the spaces between the bases are reduced to a minimum, and the relative movement of the bases is materially restricted. Extending from the reduced neck portions are tubular supports or standards 17, 18, 19 and 20. The lower ends of the supports are provided with annular rolled or pressed out movement limiting and supporting elements in the form of either continuous beads or spaced lugs. In Figs. 1 and 4 an annular abutting bead 21 is illustrated, whereas in Fig. 5 spaced lugs 21' are shown. Either type of the limiting elements is adapted to abut with the upper edge of reduced portion 16 of the base and to limit the downward progress of the tubular support. End 22 of the support, extending below the limiting element, is adapted to pass into the base and is spun out against the interior face of the reduced neck portion 16. Through this construction the connection between the support and the base is not only rendered positive, but the flared support ends 22 facilitate the insertion of the smaller supports into the larger supports, and the telescoping and registering of the neck portions of the bases, whereby a loose movement between the nested units is effectively prevented.

At the upper ends of all supports are provided either male or female connecting elements, corresponding to similar female or male connecting elements secured in the trays. In Figs. 1 and 2 the connecting elements of the supports are in the form of threaded male members and are designated in Fig. 1 by numerals 23, 24, 25 and 26, arranged, respectively, in standards 17, 18, 19 and 20. All of the threaded male members of the supports are provided with central apertures, and member 26 of the innermost standard 20 has an aperture provided with an internal thread for the reception of the threaded end of a handle or holder 27, which latter is adapted to pass through the registering central apertures of all of the tray members and their female connecting elements, and through the openings of all of the threaded male elements of the standards, as clearly seen in Fig. 1. It will be observed that the threads of all male and female connecting elements are uniform.

Trays 28 of my units, illustrated in Figs. 1 and 2, have a central upwardly directed recesses 29, each provided with a central opening, and accommodating a female threaded connecting element 30. Extending outwardly from recess 29 is a platform 31, preferably in a truly horizontal plane, provided with an annular, downwardly directed recess 32. Adjacent to recess 32 the outer edge of the tray is raised and is rolled upon itself at 33 to form a hollow bead, which serves as supporting ledge for one tray when placed upon another. It also serves as spacer for the trays, so that threaded female members 30 remain always separated from one another. Annular recess 32 is deep enough to also provide clearance between threaded element 30 and a plain surface, such as a table top, upon which each tray may be individually placed, when used without a support. Since the outer walls of recesses 32 of the trays are uniformly inclined, a concentric nesting of the trays is assured and facilitates the alignment of all apertures made in recesses 29, female members 30 and male members 23, 24 and 25. Thus when connecting handle 27 is inserted through the uppermost tray, it is guided by the registering openings to the threaded central opening in male member 26 within the innermost standard.

In Fig. 3 is illustrated a modified form of the inter-connecting elements for trays and standards, wherein within the standard is provided a threaded female member 34, while within raised or recessed portion 35 of the tray is secured a threaded male member 36. Again the tray recess, as well as member 36, are provided with aligned central apertures. The construction shown in Fig. 3 is applicable to all trays and standards.

In Figs. 1, 2 and 3 the trays are shown made of either a metal stamping or spinning, while in Fig. 6 a tray construction is illustrated intended to be made from plastic material. These plastic trays are provided with solid raised outer seat portions or ledges 37 and inwardly tapered and downwardly directed annular rims 38, which latter form spacers between the superimposed trays. From the flat portions 39 of the trays extend downwardly central hubs 40, within which are secured by molding threaded female members 41, shown in top view in Figs. 7 and 8. These female members are preferably provided with anchoring lugs 42, which are shown in their original position in Fig. 7, and which are illustrated in their bent-out position in Fig. 8. These anchoring lugs are intended to prevent structure 41 from turning in the plastic material of the tray. The tubular standards employed in the structure shown in Fig. 6 are equipped with suitable stamped-out threaded male members 43. The male member of the innermost standard is provided with a threaded insert 44 for engagement with connecting handle 45.

In the foregoing description specific forms of my invention are dealt with, and while only a few modifications are illustrated in the drawings, it is quite evident that changes and improvements may be incorporated therein, without departing from the spirit and scope of the invention, expressed in the annexed claims.

I claim:

1. In a device indicated, a plurality of nestable and separable units, each unit comprising a base, a support extending from the base and being fixedly united therewith, and a tray, uniformly sized, means associated with each support and each tray for removably connecting any of the trays with any of the supports, thereby rendering the trays and supports interchangeable, and means for fastening the innermost support to the uppermost tray, when the device is nested, thereby holding the units in their nested position.

2. In a device indicated, as set forth in claim 1, the union between the base and the support comprising a uniting and supporting element projecting outwardly from the support and engaging the upper edge of the base, and a spread end portion of the support forced against the interior face of the base.

3. In a device indicated, as set forth in claim 1, said uniformly sized connecting means for the trays and the supports comprising cooperating, threaded, apertured instrumentalities arranged with the trays and with said supports.

4. In a device indicated, as set forth in claim 1, said uniformly sized connecting means for the trays and the supports comprising cooperating, threaded, apertured instrumentalities arranged with the trays and with said supports, each tray having an upwardly extending peripheral ledge and a downwardly and inwardly directed annular rim, both serving as seating and guide means for the trays when nested, said rim additionally serving as spacer for the trays when nested, and as support for the tray when employed independently as such.

5. In a device indicated, as set forth in claim 1, said uniformly sized connecting means for the trays and the supports comprising cooperating, threaded, apertured instrumentalities arranged with the trays and with said supports, each tray having a central recess for the reception of its connecting means, a coiled-in, raised peripheral ledge, extending above the central recess, and a downwardly extending peripheral rim, adjacent to the coiled-in, raised ledge, the latter serving as a seat for the tray when resting upon another tray, said downwardly extending peripheral rim serving as a support for the tray when placed upon a flat supporting surface, such as a table top, and being designed to space the connecting means of one tray from that of an upper or lower tray or from a flat supporting surface.

6. In a device indicated, as set forth in claim 1, said uniform connecting means consisting of apertured, threaded male and female elements, secured to said trays and said supports, the threaded element of the innermost support having an internally threaded aperture, the trays having upwardly directed, apertured recesses for accommodating the threaded elements, said fastening means comprising a handle with a threaded end adapted to pass through the apertured trays and apertured threaded elements and to engage the internally threaded aperture of the element in the innermost support.

7. In a nested serving device, a plurality of nestable units adapted to be normally held together, the units comprising nestable and partially telescoping bases and telescoping supports, the latter being fixedly united with the bases, and nestable trays adapted to be removably securable with said supports, means provided with the upper ends of the supports and at the bottoms of said trays for effecting a union between any of the trays and any of the supports, thus rendering these parts of the unit interchangeable, said trays and said union effecting means being apertured, the aperture of the latter means provided with the innermost support being threaded, and connecting means passing through the apertures of the trays and of said union effecting means and engaging the threaded aperture in the latter means of the innermost support for holding together all parts of the units when nested and telescoping, said bases having turned-in peripheral edges, and split, resilient weight rings sprung into the turned-in edges of the bases.

ALAN R. FERGUSSON.